(12) United States Patent  (10) Patent No.: US 12,391,824 B2
Hagstrand et al.  (45) Date of Patent: Aug. 19, 2025

(54) POLYMER COMPOSITIONS COMPRISING MIXTURES OF POLYOLEFINS

(71) Applicant: BOREALIS AG, Vienna (AT)

(72) Inventors: Per-Ola Hagstrand, Stenungsund (SE); Thomas Gkourmpis, Stenungsund (SE); Oscar Prieto, Stenungsund (SE); Denis Yalalov, Stenungsund (SE); Christian Müller, Gothenburg (SE); Yingwei Ouyang, Gothenburg (SE); Massimiliano Mauri, Västra Frölunda (SE)

(73) Assignee: BOREALIS AG, Vienna (AT)

( * ) Notice: Subject to any disclaimer, the term of this patent is extended or adjusted under 35 U.S.C. 154(b) by 809 days.

(21) Appl. No.: 17/610,770

(22) PCT Filed: May 15, 2020

(86) PCT No.: PCT/EP2020/063600
§ 371 (c)(1),
(2) Date: Nov. 12, 2021

(87) PCT Pub. No.: WO2020/229657
PCT Pub. Date: Nov. 19, 2020

(65) Prior Publication Data
US 2023/0131086 A1   Apr. 27, 2023

(30) Foreign Application Priority Data

May 16, 2019   (EP) .................................... 19174951

(51) Int. Cl.
| *C08L 23/0884* | (2025.01) |
| *C08L 23/0807* | (2025.01) |
| *C08L 51/06*   | (2006.01) |
| *H01B 3/44*    | (2006.01) |

(52) U.S. Cl.
CPC ....... *C08L 23/0884* (2013.01); *C08L 23/0815* (2013.01); *C08L 51/06* (2013.01); *H01B 3/441* (2013.01); *C08L 2203/202* (2013.01); *C08L 2207/066* (2013.01); *C08L 2312/00* (2013.01)

(58) Field of Classification Search
CPC ........ C08L 23/10; C08L 23/14; C08L 23/147; C08L 23/08; C08L 23/0846; C08L 23/0884; C08L 51/00
See application file for complete search history.

(56) References Cited

U.S. PATENT DOCUMENTS

| 4,804,707 A | 2/1989 | Okamoto et al. |
| 4,816,634 A | 3/1989 | Lentz et al. |
| 6,211,291 B1 | 4/2001 | Rolland et al. |
| 6,774,188 B1 | 8/2004 | Robert et al. |
| 7,235,604 B2 | 6/2007 | Blondel et al. |
| 8,575,275 B2 | 11/2013 | Henschke et al. |
| 9,102,828 B2 | 8/2015 | Blondel et al. |
| 9,708,489 B2 | 7/2017 | Blondel et al. |
| 10,102,940 B2 | 10/2018 | Shimada et al. |
| 2003/0130429 A1 | 7/2003 | Bouilloux et al. |
| 2006/0199908 A1 | 9/2006 | Cheung et al. |
| 2010/0122833 A1 | 5/2010 | Han et al. |
| 2013/0116374 A1 | 5/2013 | Schillo et al. |
| 2013/0133922 A1 | 5/2013 | Steffl et al. |
| 2013/0161064 A1 | 6/2013 | Shimada |
| 2013/0175068 A1 | 7/2013 | Sutton et al. |
| 2015/0147548 A1 | 5/2015 | Mauser et al. |
| 2016/0017134 A1 | 1/2016 | Desille |
| 2016/0280915 A1 | 9/2016 | Blondel |
| 2016/0347943 A1 | 12/2016 | Wang et al. |
| 2017/0044359 A1 | 2/2017 | Kahlen et al. |
| 2017/0327675 A1 | 11/2017 | Englund et al. |
| 2018/0327581 A1 | 11/2018 | Lovera |
| 2018/0374602 A1 | 12/2018 | Perego et al. |

FOREIGN PATENT DOCUMENTS

| CN | 102030960 A  *  | 4/2011 |
| CN | 102666615 A  | 9/2012 |
| CN | 102859863 A  | 1/2013 |
| CN | 103923369 A  | 1/2013 |
| CN | 103025820 A  | 4/2013 |
| CN | 103613828    | 3/2014 |
| CN | 105602175 A  | 5/2016 |
| EA | 018317       | 7/2013 |
| EA | 019842 B9    | 11/2014 |
| EP | 0015066 A1   | 9/1980 |
| EP | 0889088      | 1/1999 |
| EP | 0922729 A1   | 6/1999 |

(Continued)

OTHER PUBLICATIONS

Ebnesajjad, S. et al. Plastic Films in Food Packaging William Andrew Publishing (Year: 2013).*
International Search Report and Written Opinion mailed Jul. 22, 2020 in International Application PCT/EP2020/063715 (9 pages).
International Search Report and Written Opinion mailed Jul. 22, 2020 in International Application PCT/EP2020/063602, 12 pages.
International Search Report and Written Opinion mailed Jun. 16, 2020 in International Application PCT/EP/2020/063600, 14 pages.
International Search Report and Written Opinion mailed Aug. 4, 2020 in International Application PCT/EP2020/063607, 13 pages.

(Continued)

*Primary Examiner* — Marc S Zimmer
*Assistant Examiner* — Jeffrey S Lenihan
(74) *Attorney, Agent, or Firm* — Meunier Carlin & Curfman LLC

(57) ABSTRACT

The invention provides a polyolefin composition comprising (i) a polyolefin (A) comprising epoxy groups; and (ii) a polyolefin (B) comprising carboxylic acid groups and/or precursors thereof, with the proviso that at least one of (A) and (B) is polyethylene. Preferably one of (A) and (B) is a low density polyethylene (LDPE) and the other is a polypropylene.

18 Claims, 2 Drawing Sheets

(56) References Cited

FOREIGN PATENT DOCUMENTS

| | | |
|---|---|---|
| EP | 2444455 | 10/2010 |
| EP | 2444980 | 4/2012 |
| EP | 2532707 | 12/2012 |
| EP | 2622012 | 12/2017 |
| EP | 3261095 | 12/2017 |
| EP | 3476885 | 5/2019 |
| FR | 2956405 A1 | 8/2011 |
| GB | 2152516 A | 8/1985 |
| JP | 2002060557 A | 2/2002 |
| RU | 2247753 | 3/2005 |
| RU | 2487156 | 7/2013 |
| RU | 2670101 C1 | 10/2018 |
| WO | 9308222 | 4/1993 |
| WO | 2009059670 | 5/2009 |
| WO | 2010003651 A1 | 1/2010 |
| WO | 2011/057928 | 5/2011 |
| WO | 2011113686 A1 | 9/2011 |
| WO | 2012052077 A1 | 4/2012 |
| WO | 2012150287 A2 | 11/2012 |
| WO | 2013/068395 | 5/2013 |
| WO | 2017/000121 | 1/2017 |
| WO | 2017/220608 | 12/2017 |
| WO | 2017/220616 | 12/2017 |

OTHER PUBLICATIONS

Encyclopedia of Polymer Science and Engineering, vol. 6 (1986), pp. 383-410.

Klimesch et al. Polyethylene: High-pressure, Encyclopedia of Materials: Science and Technology, 2001, pp. 7181-7184.

Randall. A review of high resolution liquid 13Carbon nuclear magnetic resonance characterizations of ethylene based polymers. JMS—Rev. Macromol. Chem. Phys., C29(2&3), 201-317 (1989).

* cited by examiner i) Activation of PP-*g*-MAH by ring opening:

ii) Activated PP-*g*-MAH reacts with poly(E-*stat*-GMA) resulting in crosslinking

POLYMER COMPOSITIONS COMPRISING MIXTURES OF POLYOLEFINS

This invention relates to polymer compositions which comprise two polyolefins: one comprising epoxy groups and the other comprising carboxylic acid groups, or precursors thereof, with the proviso that at least one of the polyolefins is a polyethylene. Preferably, one of the polyolefins is a low density polyethylene (LDPE) and the other is a polypropylene. In particular, the compositions of the invention offer the possibility to obtain a crosslinked polymer composition which can be crosslinked without the use of peroxide. The invention also relates to processes for crosslinking the polymer compositions, cables comprising the compositions and processes for preparing such cables.

BACKGROUND

Polyolefins produced in a high pressure (HP) process are widely used in demanding polymer applications where the polymers must meet high mechanical and/or electrical requirements. For instance in power cable applications, particularly in medium voltage (MV) and especially in high voltage (HV) and extra high voltage (EHV) cable applications, the electrical properties of the polymer composition used in the cable have significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often crosslinked to improve e.g. heat and deformation resistance, creep properties, mechanical strength, chemical resistance and abrasion resistance. During the crosslinking reaction, crosslinks (bridges) are primarily formed. Crosslinking can be effected using e.g. a free radical generating compound which is typically incorporated into the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. Crosslinking using peroxides suffers from some disadvantages, however. For example low-molecular by-products are formed during crosslinking which have unpleasant odour. These decomposition products of peroxides may include volatile by-products which are often undesired, since they may have an negative influence on the electrical properties of the cable. Therefore, the volatile decomposition products such as methane are conventionally reduced to a minimum or removed after crosslinking and a cooling step. Such a removal step, generally known as a degassing step, is time and energy consuming causing extra costs.

Furthermore, prior to the extrusion of the polyolefin composition the peroxide has to be added in a separate processing step into the polymer which increases the lead time. In addition, to achieve a high crosslinking density, organic peroxides are often required which release after peroxide degradation a high level of undesired by-products. The peroxide degradation temperature limits the maximum possible melt temperature in the extruder to about 140° C. Above that temperature, crosslinking will occur in the extruder which will result in gel or scorch particles in the cable. However a maximum melt temperature of 140° C. in the extruder limits the extruder output and might result in a lower production speed.

Thermoplastic LDPE can offer several advantages compared to a thermosetting cross-linked PE, such as no possibility of peroxide initiated scorch and no degassing step to remove peroxide decomposition products. The elimination of peroxide crosslinking and degassing steps can result in faster, less complicated and more cost effective cable production. The absence of peroxide at high temperature vulcanisation is also attractive from a safety perspective. Thermoplastics are also beneficial from a recycling point of view. However, the absence of a cross-linked material can lead to a reduced temperature resistance and hence significant problems with creep.

Thus, there is a need for alternative polyolefin compositions which avoid the disadvantages associated with peroxides, but which also offer satisfactory thermomechanical properties. Hence, it is the object of the present invention to provide a new polyolefin composition which can be crosslinked to the required crosslinking degree suitable for use in cable applications without using peroxide at all.

The present inventors have now found that the combination of a polyolefin comprising epoxy groups and a polyolefin comprising carboxylic acid groups or precursors thereof provides a composition which is ideally suited for cable manufacture and advantageously can be crosslinked without using peroxide. In the polyolefin compositions of the present invention, crosslinking occurs in situ without the need for the addition of an external crosslinking agent. During crosslinking, it is believed that the epoxy groups react with the carboxylic acid groups via the mechanism shown in FIG. 1. This may occur at temperatures typical for formulation preparation, such as compounding by, for example, extrusion. Thus, the polyolefin composition offers the attractive properties of both crosslinked and thermoplastic materials.

SUMMARY OF INVENTION

Thus, viewed from one aspect the invention provides a polyolefin composition comprising:
(i) a polyolefin (A) comprising epoxy groups; and
(ii) a polyolefin (B) comprising carboxylic acid groups, or precursors thereof;
with the proviso that at least one of polyolefin (A) and polyolefin (B) is polyethylene.

Preferably, one of polyolefin (A) and polyolefin (B) is low density polyethylene (LDPE) and the other of polyolefin (A) and polyolefin (B) is polypropylene.

Viewed from another aspect, the invention provides a process for crosslinking a polyolefin composition as hereinbefore defined, comprising heating said composition to a temperature greater than the melting temperature of at least the major polymer component(s) of the composition.

Viewed from a further aspect, the invention provides a cable comprising one or more conductors surrounded by at least one layer, wherein said layer comprises the polyolefin composition as hereinbefore defined.

The invention also provides a process for producing a cable comprising the steps of: applying on one or more conductors, a layer comprising a polyolefin composition as hereinbefore defined.

Viewed from one aspect the invention provides use of a polyolefin composition as hereinbefore defined in the manufacture of an insulation layer or semi-conductive layer in a cable, preferably a power cable.

Definitions

Wherever the term "molecular weight Mw" is used herein, the weight average molecular weight is meant.

The term "polyethylene" will be understood to mean an ethylene based polymer, i.e. one comprising at least 50 wt % ethylene, based on the total weight of the polymer as a whole. The terms "polyethylene" and "ethylene-based polymer," are used interchangeably herein, and men a polymer that comprises a majority weight percent polymerized ethylene monomer (based on the total weight of polymerisable monomers), and optionally may comprise at least one polymerised comonomer. The ethylene-based polymer may include greater than 50, or greater than 60, or greater than 70, or greater than 80, or greater than 90 weight percent units derived from ethylene (based on the total weight of the ethylene-based polymer).

The term "polypropylene" will be understood to mean a propylene based polymer, i.e. one comprising at least 50 wt % propylene, based on the total weight of the polymer as a whole.

The low density polyethylene, LDPE, of the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from low pressure polyethylenes produced in the presence of an olefin polymerisation catalyst. LDPEs have certain typical features, such as different branching architecture. A typical density range for an LDPE is 0.910 to 0.940 g/cm$^3$.

Within the context of the invention, the term "precursor" is intended to mean a chemical moiety or functional group which may be transformed into another moiety or functional group, in this case into a carboxylic acid. Precursors of carboxylic acids are described in more detail below.

The term "conductor" means herein a conductor comprising one or more wires. The wire can be for any use and be e.g. optical, telecommunication or electrical wire. Moreover, the cable may comprise one or more such conductors. Preferably the conductor is an electrical conductor and comprises one or more metal wires.

DETAILED DESCRIPTION OF THE INVENTION

The present invention relates to a particular polyolefin composition comprising (i) a polyolefin (A) comprising epoxy groups and (ii) a polyolefin (B) comprising carboxylic acid groups, or precursors thereof, with the proviso that at least one of (A) and (B) is polyethylene. In one preferred embodiment, one of polyolefin (A) and polyolefin (B) is low density polyethylene (LDPE) and the other of polyolefin (A) and polyolefin (B) is polypropylene.

In a more preferred embodiment, polyolefin (A) is LDPE and polyolefin (B) is polypropylene.

Generally, the compatibility between polyethylene and polypropylene is relatively low. Blends between these polymers therefore typically result in phase separated systems. However, the functional groups used in the invention allow polyethylene and polypropylene to react with each other. This prevents phase separation, and results in blends with considerably higher thermomechanical performance.

In all embodiments, the polyethylene is preferably a low density polyethylene (LDPE).

Polyolefin (A)

Polyolefin (A) is an olefin polymer comprising epoxy groups, i.e. an olefin polymer wherein a unit containing at least one epoxy functional group is incorporated. Such unit is referred herein as an "epoxy-group-containing monomer unit" and means an unsaturated compound comprising an epoxy group, preferably a vinyl group containing compound bearing an epoxy group. Such compounds can be used as comonomers for copolymerising epoxy-group-containing monomers units to the polyolefin (A) or can be grafted to the polyolefin (A), as is well known in the polymer field. Grafting and copolymerizing of epoxy-group containing monomer units can be made according to or analogously to the methods described in the literature.

The polyolefin (A) containing epoxy groups as well as the epoxy-group-containing monomer units are well known and commercially available. As preferable examples of epoxy-group-containing monomer units, aliphatic esters and glycidyl ethers such as an allyl glycidyl ether, a vinyl glycidyl ether, a glycidylmaleate, a glycidyl itaconate, a (meth) glycidyl acrylate, and alicyclic esters and glycidyl ethers, such as a 2-cyclohexene-1-glycidylether, a cyclohexene-4,5-diglycidyl carboxylate, a cyclohexene-4-glycidyl carboxylate, a 5-norbornene-2-methyl-2-glycidyl carboxylate and an endo cis-bicyclo (2,2,1)-5-heptene-2,3-diglycidyl dicarboxylate, can be mentioned.

Particularly preferable epoxy-group-containing monomer units include 1,2-epoxy-9-decene, 1,2-epoxy-5-hexene, 3,4-epoxy-1-butene, glycidyl methacrylate, glycidyl acrylate, and allyl glycidyl ether, especially glycidyl methacrylate.

In the present invention the epoxy-group-containing monomer unit is preferably incorporated as a comonomer, i.e. by copolymerising an olefin monomer with the vinyl group containing comonomer bearing an epoxy group (=epoxy-group-containing monomer unit).

Most preferably, the epoxy-group-containing monomer unit is glycidyl methacrylate.

Preferably, the amount of epoxy-group-containing monomer units is at least 0.1 wt %, more preferably at least 0.3 wt %, more preferably at least 0.5 wt %, such as at least 1.0 wt %, based on the total amount of polyolefin (A). The content of epoxy-group-containing monomer units is preferably 10 wt % or less, preferably 7.0 wt %, more preferably 5.0 wt % or less and most preferably 3.0 wt % or less, based on the total amount of polyolefin (A).

The suitable polyolefin (A) can be a homopolymer or a copolymer of an olefin, wherein the epoxy-group-containing monomer units are grafted as defined above, or a copolymer of an olefin and at least the epoxy-group-containing monomer units as defined above. Preferably polyolefin (A) is a copolymer of an olefin with at least the epoxy-group-containing monomer units as defined above, more preferably a copolymer of an olefin with at least glycidyl methacrylate comonomer units.

Whilst it is within the ambit of the invention for the polyolefin (A) to comprise other comonomers in addition to the epoxy-group-containing comonomer, it is preferred if the epoxy-group-containing comonomer (e.g. the glycidyl methacrylate) is the sole comonomer.

In embodiments wherein the polyolefin (A) does comprise further comonomer(s) different from the epoxy-group containing monomer units, then these may be polar comonomer(s), non-polar comonomer(s) or a mixture of the polar comonomer(s) and non-polar comonomer(s). Moreover, polyolefin (A) may optionally be unsaturated.

As a polar comonomer for the polyolefin (A), comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of the polyolefin (A) copolymer is selected from the groups of acrylate(s), methacrylate(s) or acetate(s), or any mixtures thereof.

If present in said polyolefin (A) copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polyolefin (A) copolymer is a copolymer of ethylene with $C_1$- to $C_4$-alkyl acrylate, such as methyl, ethyl, propyl or butyl acrylate, or vinyl acetate, or any mixture thereof.

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention the term "alkyl (meth)acrylate comonomer units" encompasses alkyl acrylate comonomer units and/or alkyl methacrylate comonomer units. The alkyl moiety in the alkyl(meth)acrylate comonomer units is preferably selected from $C_1$ to $C_4$-hydrocarbyls, whereby the $C_3$ or $C_4$ hydrocarbyl may be branched or linear.

As the non-polar comonomer(s) for the polyolefin (A) copolymer, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof.

If polyolefin (A) is a copolymer, it preferably comprises 0.001 to 35 wt.-%, still more preferably less than 30 wt.-%, more preferably less than 25 wt.-%, of one or more comonomer(s). Preferred ranges include 0.5 to 10 wt %, such as 0.5 to 5 wt % comonomer.

Polyolefin (A) may optionally be unsaturated, i.e. may comprise carbon-carbon double bonds (—C═C—). Preferred "unsaturated" polyolefins contain carbon-carbon double bonds/1000 carbon atoms in a total amount of at least 0.4/1000 carbon atoms. Preferably, the polyolefin is not unsaturated as defined above. By not unsaturated is meant that the C═C content is preferably less than 0.2/1000 carbon atoms, such as 0.1/1000C atoms or less.

As well known, the unsaturation can be provided to the polyolefin by means of the comonomers, a low molecular weight (Mw) additive compound, such as a CTA or scorch retarder additive, or any combinations thereof. The total amount of double bonds means herein double bonds added by any means. If two or more above sources of double bonds are chosen to be used for providing the unsaturation, then the total amount of double bonds in the polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

The unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated copolymer, it is preferably an unsaturated copolymer of ethylene with at least one polyunsaturated comonomer, and optionally with other comonomer(s), such as polar comonomer(s) which is preferably selected from acrylate or acetate comonomer(s). More preferably an unsaturated copolymer is an unsaturated copolymer of ethylene with at least polyunsaturated comonomer(s).

The polyunsaturated comonomers suitable as the non polar comonomer preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerisable comonomer is not calculated to the comonomer content.

If polyolefin (A) is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

If polyolefin (A) is unsaturated as defined above, it contains preferably at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms, more preferably lower than 2.0/1000 carbon atoms. More preferably, polyolefin (A) contains vinyl groups in total amount of more than 0.20/1000 carbon atoms, still more preferably of more than 0.30/1000 carbon atoms.

It is however, preferred if the polyolefin (A) of the invention is not unsaturated and possesses less than 0.2 C═C/1000 C atoms, preferably less than 0.1 C═C/1000 C atoms.

The polyolefin (A) may have a high melting point, which may be of importance especially for a thermoplastic insulation material. Melting points of 112° C. or more are envisaged, such as 114° C. or more, especially 116° C. or more, such as 112 to 125° C.

Polyolefin (A) may be any polymer comprising olefin monomer units. Examples of polyolefin (A) include polymers of $C_1$-$C_6$ olefins, such as a polyethylene or polypropylene. In embodiments wherein polyolefin (A) is a polypropylene, said polypropylene preferably does not comprise ethylene monomer units. A particularly preferred polyolefin (A) is polyethylene.

In particular, polyolefin (A) is preferably a polyethylene comprising epoxy-group-containing monomer units, more preferably a copolymer of ethylene with at least the epoxy-group-containing monomer units as defined above, more preferably with at least glycidyl methacrylate comonomer units.

The copolymer of ethylene with at least the epoxy-group-containing monomer units as the preferable polyolefin (A) is referred herein also shortly as ethylene/epoxy copolymer.

The ethylene/epoxy copolymer may further comprise further comonomer units as defined above, however it is preferred if the epoxy-group-containing comonomer is the only comonomer present.

In one embodiment, the polyolefin (A) is a copolymer of ethylene with at least an epoxy-group-containing comonomer and optionally with other comonomer(s), different from the epoxy-group-containing monomer units, which other comonomer is preferably a polar comonomer different from the epoxy-group-containing monomer units, more preferably an acrylate or acetate group containing comonomer units.

The polyolefin (A) may be selected from an ethylene copolymer with glycidyl methacrylate comonomer units or an ethylene copolymer with glycidyl methacrylate comonomer units and a polar comonomer selected from alkyl(meth)acrylate or a vinyl acetate comonomer units, even more preferably from an alkyl acrylate or a vinyl acetate comonomer units, even more preferably from a methyl acrylate, ethyl acrylate, butyl acrylate or vinyl acetate comonomer units, most preferably from a methyl acrylate, an ethyl acrylate or butyl acrylate comonomer units. Most preferably the polyolefin (A) is selected from ethylene copolymer with glycidyl methacrylate comonomer units or ethylene copolymer with glycidyl methacrylate comonomer units and C1-C4 alkyl acrylate comonomer units, preferably methyl acrylate comonomer units. Moreover, the most preferred ethylene/epoxy copolymer for the polyolefin (A) is an ethylene copolymer with glycidyl methacrylate comonomer units.

The ethylene polymer as the preferred polyolefin (A) may have a melt flow rate $MFR_2$, determined according to ISO 1133 under a load of 2.16 kg and a temperature of 190° C., of at least 0.1 g/10 min, more preferably of at least 0.5 g/10 min. More preferably such ethylene polymer has a melt flow rate $MFR_2$, determined according to ISO 1133 under a load of 2.16 kg and a temperature of 190° C., of 75 g/10 min or less, more preferably 60 g/10 min or less, even more preferably 55 g/10 min or less. Typical preferred ranges for the $MFR_2$ of the ethylene polymer are 0.1 to 20 g/10 min, such as 0.1 to 10 g/10 min, e.g. 0.5 to 5.0 g/10 min.

The ethylene polymer as the preferred polyolefin (A) typically has a density of higher than 860 kg/m³. Preferably such ethylene polymer has a density of not higher than 960 kg/m³, and preferably of not higher than 955 kg/m³. A preferred density range is 917 to 935 kg/m³.

In general, the molecular weight distribution of polyolefin (A) may be in the range 5 to 10, such as 6 to 8.

The ethylene polymer as polyolefin (A) may be a low density ethylene polymer (LDPE) or a low pressure polymer such as LLDPE, MDPE and HDPE. Low pressure polymers are particularly well suited to embodiments wherein the epoxy-group containing monomer units are grafted to the polymer.

The preferred ethylene polymer as polyolefin (A) is a low density ethylene polymer (LDPE). The LDPE may be produced in a high pressure (HP) process in a tubular or autoclave reactor or in any combination thereof, both in case the epoxy-group-containing monomer units are grafted to a homopolymer or copolymer of ethylene after the production of the ethylene polymer as polyolefin (A), and in case the epoxy-group-containing monomer units are copolymerised with ethylene and optionally with other comonomer(s). Hence, in case the epoxy-group containing monomer units are introduced by grafting the polymer prior to grafting may also be produced by this process.

Accordingly, the polyolefin (A) of the invention is preferably an LDPE polymer, which is preferably produced at high pressure by free radical initiated polymerisation. The high pressure (HP) polymerisation is widely described in the literature and the adjustment of process conditions for further tailoring the other properties of the polyolefin depending on the desired end application is within the skills of a skilled person.

In a tubular reactor the polymerisation is effected at temperatures which typically range up to 400° C., preferably from 80 to 300° C., and pressures from 70 MPa, preferably 100 to 400 MPa, more preferably from 100 to 350 MPa. Pressure can be measured at least after compression stage and/or after the tubular reactor. Temperature can be measured at several points during all steps.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available. The polymerization pressure is typically 20 to 300, such as 20 to 250, MPa. The polymerization reaction is exothermic and after startup (at elevated temperature, e.g. from 80 to 150° C. to create the first radicals) the exothermic heat generated sustains the reaction. Temperature in each zone is controlled by the cooled incoming feed mixture. Suitable temperatures range from 80 to 300° C. The process is well known to a skilled person.

Such autoclave polymerisation is preferred when ethylene is copolymerized with the epoxy-group-containing monomer as defined above, preferably with glycidyl methacrylate comonomer, and optionally with other comonomer(s), such as a polar comonomer as defined above.

The LDPE may have a density of 915 to 940 kg/m³, preferably 918 to 935 kg/m³, especially 920 to 932 kg/m³, such as about 920 to 930 kg/m³.

The $MFR_2$ (2.16 kg, 190° C.) of the LDPE polymer is preferably from 0.05 to 30.0 g/10 min, more preferably is from 0.1 to 20 g/10 min, and most preferably is from 0.1 to 10 g/10 min, especially 0.1 to 5.0 g/10 min. In a preferred embodiment, the MFR$_2$ of the LDPE is 0.1 to 4.0 g/10 min, especially 0.5 to 4.0 g/10 min, especially 1.0 to 3.0 g/10 min.

The LDPE may have an Mw of 80 kg/mol to 200 kg/mol, such as 100 to 180 kg/mol.

The LDPE may have a PDI of 5 to 15, such as 8 to 14.

It is possible to use a mixture of LDPEs, however it is preferred if a single LDPE is used.

Polyolefin (A) may be present in the polyolefin composition of the invention in an amount in the range 2 to 98 wt % relative to the total weight of the composition as a whole.

Polyolefin (A) is preferably present in an amount of 50 to 98 wt %, more preferably 60 to 98 wt %, even more preferably 70 to 98 wt %, such as 80 to 98 wt %, e.g. 90 to 98 wt % or 90 to 95 wt % relative to the total weight of the composition as a whole.

Polyolefin (B)

Polyolefin (B) is an olefin polymer comprising carboxylic acid groups, or precursors thereof. In the context of the present invention, carboxylic acid groups and groups being precursors of carboxylic acids may hereafter be referred to as "groups bearing carboxylic functionality".

The carboxylic acid groups or precursors thereof may be present as part of a comonomer unit or may be grafted to the polyolefin. Preferably these groups are grafted to the polyolefin.

In one embodiment, the olefin polymer comprises comonomer units comprising carboxylic acid groups. An example of such comonomer units is acrylic acid.

As an alternative, polyolefin (B) may be an olefin polymer comprising comonomer units comprising functional groups being precursors of carboxylic acid groups. Such a polyolefin (B) may be extruded at elevated temperature (for instance 190° C.) without any pre-cross-linking and would then undergo conversion to carboxylic acid functionalities inside the vulcanization tube to cross-link with the epoxy groups. Preferably, these comonomer units are acrylate comonomer units, more preferably alkyl (meth)acrylate comonomer units.

In the present invention, the term "alkyl (meth)acrylate comonomer units" encompasses alkyl acrylate comonomer units and/or alkyl methacrylate comonomer units. The alkyl moiety in the alkyl(meth)acrylate comonomer units may be selected from C1 to C8-hydrocarbyls, whereby the hydrocarbyl may be branched or linear. In particular, the alkyl moiety is C3 or C4 hydrocarbyl, wherein the C3 or C4 hydrocarbyl may be linear or branched. Particularly preferred alkyl (meth)acrylate comonomer units include tert-butyl acrylate and tert-butyl methacrylate.

Among other possible precursors of carboxylic acids, anhydrides may be mentioned, such as maleic anhydride. The skilled person will appreciate that when we refer to maleic anhydride in this context, we mean the compound which is grafted to the polyolefin. Once grafted the maleic anhydride generates a succinic anhydride group bound to the polyolefin which can in turn be converted to a carboxylic acid group.

Finally, the polyolefin (B) may be a terpolymer comprising comonomer units comprising carboxylic acid groups and comonomer units comprising functional groups being precursors of carboxylic acid groups. Such precursors of a carboxylic acid may e.g. be an ester group. In this case, the cross-linking temperature should be sufficiently high such that all of the ester groups are converted to carboxylic acid functionalities. Alternatively, the precursor may be converted to the carboxylic acid via thermal splitting. An example of a terpolymer that may be used as the polyolefin (B) in the context of the present invention is e.g. a terpolymer comprising tertbutyl acrylate and acrylic acid comonomer units.

The polyolefin (B) may comprise further comonomer(s) different from monomer units containing carboxylic acid groups and/or precursors of carboxylic acids. If present, these further comonomers may be polar comonomer(s). Such polar comonomer(s) may be present in an amount of 0 to 50 wt %, relative to the total amount of polyolefin (B). In case the polyolefin (B) comprises further polar comonomer (s), then the further polar comonomer(s) may be present in an amount of at least 1.0 wt %, more preferably of at least 2.0 wt %, more preferably of at least 5.0 wt % based on the total amount of the polyolefin (B). In case polyolefin (B) comprises polar comonomers, then, preferably, the polar group containing monomer units are present in an amount of not more than 50 wt %, more preferably not more than 45 wt %, even more preferably of not more than 40 wt %, even more preferably not more than 35 wt %, even more preferably not more than 25 wt %, and most preferably of not more than 20 wt % based on the total amount of the polyolefin (B).

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention, the term "alkyl (meth)acrylate comonomer units" encompasses alkyl acrylate comonomer units and/or alkyl methacrylate comonomer units.

The alkyl moiety in the alkyl(meth)acrylate comonomer units may be selected from C1 to C8-hydrocarbyls, whereby the hydrocarbyl may be branched or linear. In particular, the alkyl moiety is C3 or C4 hydrocarbyl, wherein the C3 or C4 hydrocarbyl may be linear or branched.

In the context of the present invention, the polyolefin (B) comprising comonomers bearing carboxylic acid groups or functional groups being precursors of carboxylic acid groups may be a blend of at least two polymers each of which comprises comonomer units bearing carboxylic acid groups or functional groups being precursors of carboxylic acid groups. The carboxylic acid groups or functional groups being precursors of carboxylic acid groups in each of the polymers being a part of the polyolefin (B) may be same or different.

In analogy to the above, the comonomer units of the polyolefin (B) may either be copolymerized or grafted into the olefin polymer. Methods of grafting are well known to those skilled in the field of polymer chemistry.

As previously discussed, in the present invention, the monomer units bearing carboxylic functionality are preferably grafted onto the polyolefin.

In all embodiments, preferable monomer units bearing carboxylic acid functionality are at least one of acrylic acid, maleic anhydride (MAH), or an alkyl (meth)acrylate, such as tert-butyl methacrylate or tert-butyl acrylate, in particular maleic anhydride. Whilst it is within the ambit of the invention for more than one type of monomer unit bearing carboxylic acid functionality to be present, preferably only one type is present.

The amount of monomer units bearing carboxylic functionality may be at least 0.1 wt %, more preferably at least 0.5 wt %, more preferably at least 1 wt %, based on the total amount of polyolefin (B).

The content of monomer units bearing carboxylic functionality may be below 20 wt %, preferably below 15 wt %, more preferably below 10 wt % based on the total amount of polyolefin (B).

Polyolefin (B) may be any polymer comprising olefin monomer units. Examples of polyolefin (B) include polymers of C1-C6 olefins, such as a polyethylene or polypropylene.

Wherein the polyolefin (B) is a polyethylene, it may have the properties as defined above for polyolefin (A).

In a particularly preferable embodiment, polyolefin (B) is a polypropylene.

In one embodiment wherein polyolefin (B) is a polypropylene, said polypropylene preferably does not comprise ethylene monomer units.

The polypropylene typically has a melt flow rate ($MFR_2$) determined according to ISO 1133 under a load of 2.16 kg and a temperature of 230° C., of 0.1 to 100 g/10 min, preferably from 0.5 to 50 g/10 min. Most preferably, the MFR is in the range of 1.0 to 5.0 g/10 min, such as 1.5 to 4.0 g/10 min.

The density of the polypropylene may typically be in the range 890 to 940 kg/m$^3$, ideally 0.895 to 0.920 g/cm$^3$, preferably from 0.900 to 0.915 g/cm$^3$, and more preferably from 0.905 to 0.915 g/cm$^3$ as determined in accordance with ISO 1183.

The propylene may have an Mw in the range of 200 kg/mol to 600 kg/mol. The polypropylene polymer preferably has a molecular weight distribution Mw/Mn, being the ratio of the weight average molecular weight Mw and the number average molecular weight Mn, of less than 4.5, such as 2.0 to 4.0, e.g. 3.0.

Usually the melting temperature of the polypropylene is within the range of 135 to 170° C., preferably in the range of 140 to 168° C., more preferably in the range from 142 to 166° C. as determined by differential scanning calorimetry (DSC) according to ISO 11357-3. Ideally, the polypropylene has a melting temperature (Tm) of greater than 140° C., preferably greater than 150° C.

The polypropylene may be prepared by any suitable known method in the art or can be obtained commercially. The skilled worker will be familiar with appropriate methods. Where the polypropylene comprises grafted carboxylic acid groups or precursors thereof, the grafting reaction will usually be carried out after polymerisation. Where the carboxylic acid groups or precursors thereof are incorporated as a comonomer, they will be added during polymerisation.

Polyolefin (B) may be present in the polyolefin composition of the invention in an amount in the range 2 to 98 wt % relative to the total weight of the composition as a whole.

Polyolefin (B) is preferably present in an amount of 2 to 50 wt %, more preferably 2 to 40 wt %, even more preferably 2 to 30 wt %, such as 2 to 20 wt %, e.g. 2 to 10 wt % or 2 to 5 wt %, relative to the total weight of the composition as a whole.

Composition

Whilst it is within the ambit of the invention for the polyolefin composition to comprise other polymer components in addition to polyolefin (A) and (B), it is preferable if the composition consists of polyolefins (A) and (B) as the only polymer components.

In any of the above embodiments the use of peroxide with the undesired problems as discussed above can be markedly reduced or completely avoided. Hence, the polyolefin composition of the invention is preferably substantially free of peroxide (e.g. comprises less than 0.5 wt % peroxide, preferably less than 0.1 wt % peroxide, such as less than 0.05 wt % peroxide, relative to the total weight of the composition). Even more preferably, the polyolefin composition is free of any added peroxide (i.e. contains 0 wt % peroxide, relative to the total weight of the composition) and most preferably free of any radical forming agent.

In one embodiment, the composition is crosslinked. Where crosslinks are present, they may be formed from new covalent bonds formed by the reaction of the epoxy groups with the carboxylic acid groups.

Thus, in a further embodiment, the invention provides a process for crosslinking the polyolefin composition of the invention, said process comprising heating the composition to a temperature greater than the melting temperature of at least the major component of the composition, more preferably to a temperature greater than the melting temperature of all polyolefin components on the composition, e.g. at least 15° C. above the melting temperature. According to an example embodiment, the polymer composition is heated to the melting temperature of polypropylene, i.e. around 160° C.

Typically, said process will be carried out by compounding by, for example, extrusion. Preferably, said process does not involve the use of peroxide. Thus, the crosslinked composition of the invention is substantially free of peroxide (e.g. comprises less than 0.5 wt % peroxide, preferably less than 0.1 wt % peroxide, such as less than 0.05 wt % peroxide, relative to the total weight of the composition) and associated decomposition products. As a result of this the process for crosslinking the polyolefin composition of the invention typically does not comprise a degassing step.

Typically, the crosslinking involves heating to a temperature of at least 150° C., preferably at least 160° C., such as at least 170° C. The crosslinking process will generally involve heating to 300° C. or less, such as 250° C. or less.

In some embodiments, the gel content of the polyolefin composition may be very low, e.g. less than 5%, such as 0%. Alternatively, the gel content of the polyolefin composition of the present invention may be at least 40%, more preferably at least 45% and most preferably at least 50%, as determined according to "Gel Content" as described below under "Measurement methods".

The tensile creep strain measured after 15 minutes is preferably less than 15% (as measured by the test method is the test methods section below).

The tensile creep strain measured after 100 minutes is preferably less than 30% (as measured by the test method is the test methods section below).

The combination of a polyolefin comprising epoxy groups and a polyolefin comprising carboxylic acid groups or precursors thereof provides a composition which is ideally suited for cable manufacture and advantageously can be crosslinked without using peroxide.

According to one example embodiment, polyolefin (A) is LDPE based, and is present in the polyolefin composition of the invention in the range 90 to 98 wt %, such as e.g. about 95 wt %, relative to the total weight of the composition as a whole, and polyolefin (B) is PP based, and is present in the polyolefin composition of the invention in an amount in the range 2 to 10 wt %, such as e.g. 5 wt %, relative to the total weight of the composition as a whole.

Cable

The cable of the invention is typically a power cable, such as an AC cable or a DC cable. A power cable is defined to be a cable transferring energy operating at any voltage level, typically operating at voltages higher than 1 kV. The power cable can be a low voltage (LV), a medium voltage (MV), a high voltage (HV) or an extra high voltage (EHV) DC cable, which terms, as well known, indicate the level of operating voltage.

Preferably the HV DC power cable of the invention is one operating at voltages of 40 kV or higher, even at voltages of 50 kV or higher. More preferably, the HV DC power cable operates at voltages of 60 kV or higher. The invention is also highly feasible in very demanding cable applications and further cables of the invention are HV DC power cable operating at voltages higher than 70 kV. Voltages of 100 kV or more are targeted, such as 200 kV or more, more preferably 300 kV or more, especially 400 kV or more, more especially 500 kV or more. Voltages of 640 kV or more, such as 700 kV are also envisaged. The upper limit is not limited. The practical upper limit can be up to 1500 kV, such as 1100 kV. The cables of the invention operate well therefore in demanding extra HV DC power cable applications operating 400 to 850 kV, such as 650 to 850 kV.

A cable, such as a power cable (e.g. a DC power cable) comprises one or more conductors surrounded by at least one layer. The polyolefin composition of the invention may be used in that at least one layer.

Preferably, the cable comprises an inner semiconductive layer comprising a first semiconductive composition, an insulation layer comprising the polymer composition of the invention and an outer semiconductive layer comprising a second semiconductive composition, in that order.

The polymer composition of the invention may be used in one or more of the semiconductive layer(s) of the cable. In such embodiments, a conductive filler, such as carbon black, may be added to the composition.

The polyolefin composition of the invention is preferably used in the insulation layer of the cable. Ideally, the insulation layer comprises at least 95 wt %, such as at least 98 wt % of the polyolefin composition of the invention, such as at least 99 wt %, relative to the total weight of the layer as a whole. It is preferred therefore if the polyolefin composition of the invention is the only non-additive component used in the insulation layer of the cables of the invention. Thus, it is preferred if the insulation layer consists essentially of the composition of the invention. The term consists essentially of is used herein to mean that the only polyolefin composition present is that defined herein. It will be appreciated that the insulation layer may contain standard polymer additives such as water tree retarders, antioxidants and so on. These are not excluded by the term "consists essentially of". Note also that these additives may be added as part of a masterbatch and hence carried on a polymer carrier. The use of masterbatch additives is not excluded by the term consists essentially of.

As discussed hereinbefore, the polyolefin composition of the invention may be crosslinked. Thus, in one embodiment, the cable of the invention, e.g. the insulation layer may be crosslinked. It will be understood that "crosslinked" in this context means that the components form a "network", which may result from the new covalent bonds formed by the reaction of the epoxy groups with the groups bearing carboxylic functionality.

It is preferred if the insulation layer comprises no external crosslinking agent. The insulation layer is thus ideally free of peroxides and hence free of by-products of the decomposition of the peroxide.

Naturally, the absence of an external crosslinking agent also simplifies the cable production process. Also, it is generally required to degas a cross-linked cable layer to remove the by-products of these agents after crosslinking. Where these are absent, no such degassing step is required. Another advantage of not using an external crosslinking agent is the elimination of the health and safety issues associated with the handling and storage of these agents, particularly peroxides.

The insulation layer may contain, in addition to the polyolefin composition of the invention further component(s) such as additives, e.g. antioxidant(s), scorch retarder(s) (SR), crosslinking booster(s), stabiliser(s), processing aid(s), flame retardant additive(s), water tree retardant additive(s), acid or ion scavenger(s), inorganic filler(s), dielectric liquids and voltage stabilizer(s), as known in the polymer field.

The insulation layer may therefore comprise conventionally used additive(s) for wire and cable applications, such as one or more antioxidant(s). As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the insulation layer does not comprise a carbon black. Also preferably, the insulation layer does not comprise flame retarding additive(s), e.g. a metal hydroxide containing additives in flame retarding amounts.

The used amounts of additives are conventional and well known to a skilled person, e.g. 0.1 to 1.0 wt %.

The cable of the invention also typically contains inner and outer semiconductive layers. These can be made of any conventional material suitable for use in these layers. The inner and the outer semiconductive compositions can be different or identical and may comprise a polymer(s) which is preferably a polyolefin or a mixture of polyolefins and a conductive filler, preferably carbon black. Suitable polyolefin(s) are e.g. polyethylene produced in a low pressure process (LLDPE, MDPE, HDPE), polyethylene produced in a HP process (LDPE) or a polypropylene. The carbon black can be any conventional carbon black used in the semiconductive layers of a power cable, preferably in the semiconductive layer of a power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the polymer composition of the semiconductive layer(s) comprises 10 to 50 wt % carbon black, based on the total weight of the composition.

In a preferable embodiment, the outer semiconductive layer is cross-linked. In another preferred embodiment, the inner semiconductive layer is preferably non-cross-linked. Overall therefore it is preferred if the inner semiconductive layer and the insulation layer do not comprise an external crosslinking agent. A peroxide crosslinking agent may therefore be provided in the outer semiconductive layer only.

The conductor typically comprises one or more wires. Moreover, the cable may comprise one or more such conductors. Preferably the conductor is an electrical conductor and comprises one or more metal wires. Cu or Al wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of applying on one or more conductors, preferably by (co)extrusion, a layer comprising the polyolefin composition of the invention.

The invention also provides a process for producing a cable comprising the steps of applying on one or more conductors, preferably by (co)extrusion, an inner semiconductive layer, an insulation layer and an outer semiconductive layer, in that order, wherein the insulation layer comprises the composition of the invention.

The invention also provides a process for producing a cable comprising the steps of:
  applying on one or more conductors, preferably by (co)extrusion, an inner semiconductive layer, an insulation layer and an outer semiconductive layer, in that order, wherein the insulation layer comprises the composition of the invention.

The process may optionally comprise the steps of crosslinking one or both of the inner semiconductive layer or outer semiconductive layer.

More preferably, a cable is produced, wherein the process comprises the steps of
  (a)—providing and mixing, preferably melt mixing in an extruder, an optionally crosslinkable first semiconductive composition comprising a polymer, a carbon black and optionally further component(s) for the inner semiconductive layer,
    providing and mixing, preferably melt mixing in an extruder, the polyolefin composition of the invention; and
    providing and mixing, preferably melt mixing in an extruder, a second semiconductive composition which is optionally crosslinkable and comprises a polymer, a carbon black and optionally further component(s) for the outer semiconductive layer,
  (b) applying on one or more conductors, preferably by coextrusion,
    a melt mix of the first semiconductive composition obtained from step (a) to form the inner semiconductive layer,
    a meltmix of polyolefin composition of the invention obtained from step (a) to form the insulation layer, and
    a meltmix of the second semiconductive composition obtained from step (a) to form the outer semiconductive layer, and
  (c) optionally crosslinking at crosslinking conditions one or both of the first semiconductive composition of the inner semiconductive layer and the second semiconductive composition of the outer semiconductive layer, of the obtained cable.

Preferably in step (c) only the second semiconductive polymer composition of the outer semiconductive layer is cross-linked.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polyolefin composition of the invention and the optional and preferred first and second semiconductive compositions can be produced before or during the cable production process.

Preferably, the polymers required to manufacture the cable of the invention are provided to the cable production process in form of powder, grain or pellets. Pellets mean herein generally any polymer product which is formed from reactor-made polymer (obtained directly from the reactor) by post-reactor modification to a solid polymer particles.

Accordingly, the components can be premixed, e.g. melt mixed together and pelletized, before mixing. Alternatively, and preferably, these components can be provided in separate pellets to the (melt) mixing step (a), where the pellets are blended together.

The (melt) mixing step (a) of the provided polyolefin composition of the invention and of the preferable first and second semiconductive compositions is preferably carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any crosslinking agent can be added before the cable production process or during the (melt) mixing step (a). For instance, and preferably, the crosslinking agent and also the optional further component(s), such as additive(s), can already be present in the polymers used. The crosslinking agent is added, preferably impregnated, onto the solid polymer particles, preferably pellets.

It is preferred that the melt mix of the polyolefin composition obtained from (melt)mixing step (a) consists of polyolefins (A) and (B) as the sole polymer component(s). The optional and preferable additive(s) can be added to polymer composition as such or as a mixture with a carrier polymer, i.e. in a form of a master batch.

The crosslinking of other layers can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The thickness of the insulation layer of the cable, more preferably the power cable, is typically 2 mm or more, preferably at least 3 mm, preferably of at least 5 to 100 mm, more preferably from 5 to 50 mm, and conventionally 5 to 40 mm, e.g. 5 to 35 mm, when measured from a cross section of the insulation layer of the cable.

The thickness of the inner and outer semiconductive layers is typically less than that of the insulation layer, and in power cables can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.5-3.0 mm, preferably 0.8-2.0 mm. The thickness of the outer semiconductive layer is preferably from 0.3 to 10 mm, such as 0.3 to 5 mm, preferably 0.5 to 3.0 mm, preferably 0.8-3.0 mm. It is evident for and within the skills of a skilled person that the thickness of the layers of the power cable depends on the intended voltage level of the end application cable and can be chosen accordingly.

The cable of the invention is preferably a power cable, preferably a power cable operating at voltages up to 1 kV and known as low voltage (LV) cables, at voltages 1 kV to 36 kV and known as medium voltage (MV) cables, at voltages higher than 36 kV, known as high voltage (HV) cables or extra high voltage (EHV) cables. The terms have well known meanings and indicate the operating level of such cables.

More preferably the cable is a power cable comprising a conductor surrounded by at least an inner semiconductive layer, an insulation layer and an outer semiconductive layer, in that order, wherein at least one layer comprises the polyolefin composition of the invention.

Even more preferably, the cable is a power cable comprising a conductor surrounded by at least an inner semiconductive layer, an insulation layer and an outer semiconductive layer, in that order, wherein the at least one layer comprises, preferably consists the polyolefin composition of the invention. Preferably, the at least one layer is the insulation layer.

In a further embodiment, the invention provides the use of a polyolefin composition as hereinbefore defined in the manufacture of a layer, preferably an insulation layer, of a cable.

Such cable embodiment enables to crosslink the cable without using peroxide which is very beneficial in view of the problems caused by using peroxide as discussed above.

EXAMPLES

Determination Methods

Figure 1:
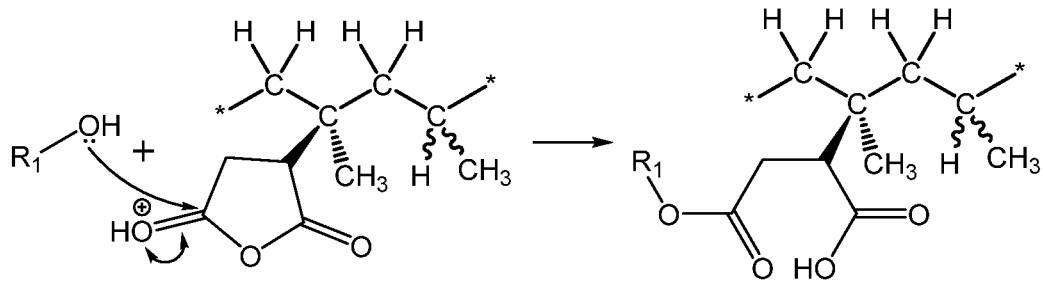
FIG. 1: Reaction scheme between PP-g-MAH and poly (E-stat-GMA). $R_1$ is typically hydrogen or any alkyl group.
Figure 1:
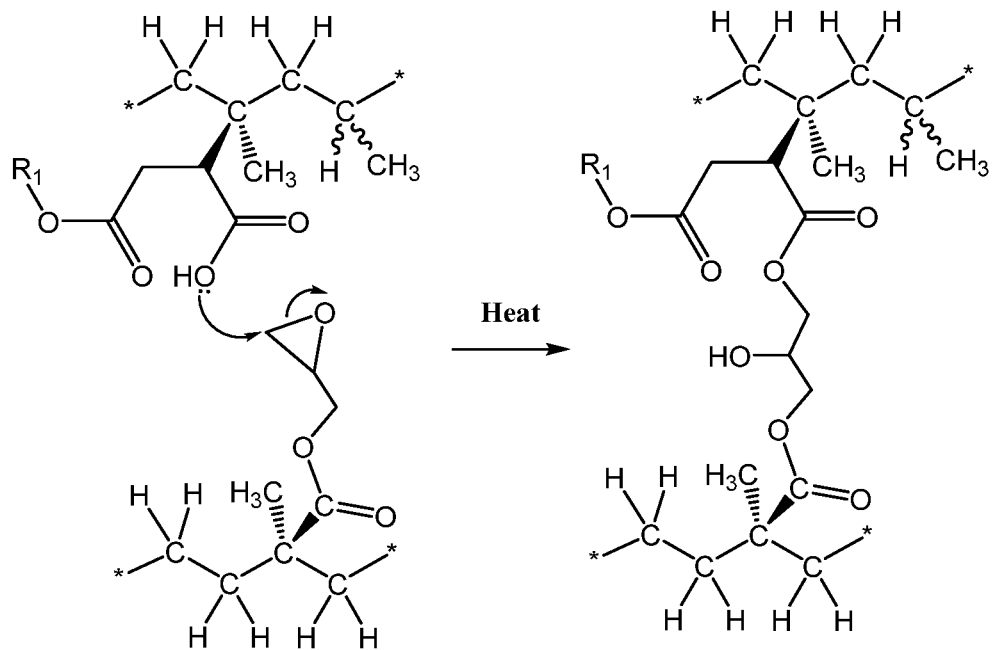

Unless otherwise stated in the description or claims, the following methods were used to measure the properties defined generally above and in the claims and in the examples below. The samples were prepared according to given standards, unless otherwise stated.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k1(A/R)+k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$) or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt % Films were pressed using a Specac film press at 150° C., approximately at 5 tons, 1-2 minutes, and then cooled with cold water in a not controlled manner. The accurate thickness of the obtained film samples was measured. After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^1$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$ was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains 0.20/$M_{butylacrylate}$ (128 g/mol)=1.56×10$^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Density of the PP polymer was measured according to ISO 1183/1872-2B.

Method for Determination of the Amount of Double Bonds in the Polymer Composition or in the Polymer This can be carried out following the protocol in WO2011/057928

Melting Temperature

Melting Temperature™, is measured with Mettler TA820 differential scanning calorimetry (DSC) on 5-10 mg samples. Melting curves are obtained during 10° C./min cooling and heating scans between 30° C. and 225° C. Melting temperatures were taken as the peaks of endotherms and exotherms.

Gel Content

The gel content of crosslinked samples was determined gravimetric ally using a solvent extraction technique. The samples (~250 mg) were placed in pre-weighed 100 mesh stainless steel baskets and extracted in 0.5 dm$^3$ decalin by refluxing the solvent for 6 h. After the extraction, the samples were dried first at ambient overnight and then under vacuum for about 8 hours at 50° C. After this period, the non-soluble fraction that remained in the basket reached a constant weight, which was used to calculate the gel content.

Creep Tests Using Dynamic Mechanical Analyser

20×5 mm pieces were cut from 1.25 mm thick melt-pressed films. Creep measurements were carried out using a TA Q800 DMA in tensile mode. First, samples were heated from 25° C. to 135° C. at 10° C. min$^{-1}$ with a constant preload force of 0.001 N, corresponding to a stress of 0.16 kPa applied. Upon reaching 135° C., a constant stress of 5 kPa was applied for 100 min to the sample and the resulting strain was recorded as a function of time.

Materials

LDPE: The ethylene-glycidyl methacrylate copolymer poly(E-stat-GMA) with a GMA content of 4.5 wt %, a melt flow index MFI~2 g/10 min (190° C./2.16 kg, provided by supplier), and a density of 0.93 g cm$^{-3}$ was obtained from Arkema (Lotader series AX8820).

PP: The polypropylene-maleic anhydride graft copolymer PP-g-MAH with a MA content of 8-10 wt %, viscosity is 4 poise and a density of 0.93 g cm$^{-3}$ was obtained from Sigma Aldrich (product number 427845).

Sample Preparation:

A polyolefin composition was prepared comprising 95 wt % LDPE and 5 wt % PP materials as defined above, by compounding through extrusion for 5 minutes at 220° C. using an Xplore Micro Compounder MC5. In a hot press, the extruded material was heated to 180° C. and the pressure was increased up to 37000 kN/m$^2$, when the material was left for a further minute before cooling to room temperature. This procedure resulted in 1.25 mm thick plates.

Results

Figure 2:
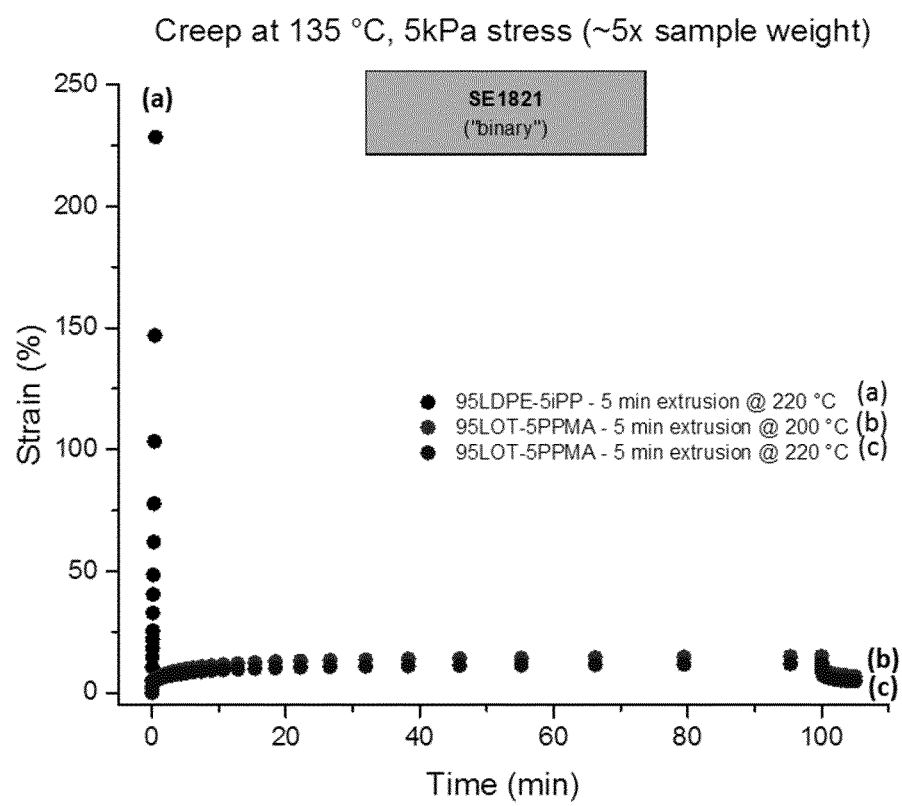
FIG. 2: Tensile creep strain vs. time for comparative and inventive examples
  a: Comparative example 1: Extruded at 220° C. for 5 minutes, pressed for 1 minute at 180° C. (gel content: 0%)
  b: Inventive example 1: Extruded at 200° C. for 5 minutes, pressed for 1 minute at 180° C. (gel content: 20%)
  c: Inventive example 2: Extruded at 220° C. for 5 minutes, pressed for 15 minutes at 180° C. (gel content: 40%)

The samples for creep experiments were prepared by cutting 20×5 mm samples from 1.25 mm thick melt-pressed films. Creep results are shown in Table 1 and FIG. 2. The results clearly illustrate that the inventive examples have considerably higher creep resistance. For example, after 30 seconds of loading (5 kPa), the strain in the comparative composition is 147%, whereas the inventive compositions exhibit a strain below 6%.

TABLE 1

|  | Comparative example 1 | Inventive example 1 | Inventive example 2 |
|---|---|---|---|
| "LDPE" [weight %] | 95 | 0 | 0 |
| "LDPE-epoxy" [weight %] | 0 | 95 | 95 |
| "PP-MAH" [weight %] | 0 | 5 | 5 |
| "iPP" [weight %] | 5 | 0 | 0 |
| Compounding temperature [° C.] | 220 | 200 | 220 |
| Plaque press temperature [° C.] | 180 | 180 | 180 |
| Creep temperature [° C.] | 135 | 135 | 135 |
| Creep stress [kPa] | 5 | 5 | 5 |
| Creep strain at 15 sec [%] | 62 | 4.6 | 4.2 |
| Creep strain at 30 sec [%] | 147 | 5.4 | 4.8 |
| Creep strain at 1 min [%] | fail | 6.5 | 5.6 |
| Creep strain at 15 min [%] | fail | 12.5 | 9.9 |
| Creep strain at 55 min [%] | fail | 14.3 | 11.3 |
| Creep strain at 100 min [%] | fail | 15 | 11.9 |

The invention claimed is:

1. A polyolefin composition comprising:
   (i) 50 to 98 wt % relative to the total weight of the composition as a whole of a polyolefin (A) comprising epoxy groups; and
   (ii) 2 to 50 wt % relative to the total weight of the composition as a whole of a polyolefin (B) comprising carboxylic acid groups and/or precursors thereof, wherein polyolefin (A) is a low density polyethylene (LDPE) and polyolefin (B) is a polypropylene.

2. The polyolefin composition as claimed in claim 1, wherein the carboxylic acid groups and/or precursors thereof are grafted to said polyolefin (B).

3. The polyolefin composition as claimed in claim 1, wherein the carboxylic acid groups and/or precursor thereof is at least one of acrylic acid, maleic anhydride (MAH), or an alkyl (meth)acrylate.

4. The polyolefin composition as claimed in claim 1, wherein component (i) is present in an amount of 90 to 98 wt % and component (ii) is present in an amount of 2 to 10 wt %, relative to the total weight of the composition as a whole.

5. The polyolefin composition as claimed in claim 1, wherein the epoxy groups are present in the form of an epoxy-group-containing comonomer.

6. The polyolefin composition as claimed in claim 5, wherein said epoxy-group-containing comonomer is selected from the group consisting of 1,2-epoxy-9-decene, 1,2-epoxy-5-hexene, 3,4-epoxy-1-butene, glycidyl methacrylate, glycidyl acrylate, and allyl glycidyl ether.

7. The polyolefin composition as claimed in claim 1, wherein said LDPE has an MFR$_2$ (2.16 kg, 190° C.) of 0.1 to 10 g/10 min.

8. The polyolefin composition as claimed in claim 1, wherein said LDPE has a density of 917 to 935 kg/m$^3$.

9. The polyolefin composition as claimed in claim 1, wherein said polypropylene has a melting temperature (Tm) of greater than 140° C.

10. The polyolefin composition as claimed in claim 1, wherein said composition is substantially free of peroxide.

11. A process for crosslinking the polyolefin composition as defined in claim 1, wherein said process comprises heating said polyolefin composition to a temperature greater than the melting point of at least the major polymer component(s) of the composition.

12. The process as claimed in claim 11, wherein said process does not use peroxide.

13. A cable comprising one or more conductors surrounded by at least one layer, wherein said layer comprises the polyolefin composition as defined in claim 1.

14. The cable as claimed in claim 13, wherein said one or more conductors are surrounded by at least an inner semiconductive layer, an insulation layer, and an outer semiconductive layer, in that order.

15. The cable as claimed in claim 13, wherein said layer comprising said polyolefin composition is an insulation layer.

16. The cable as claimed in claim 13, wherein said cable is crosslinked.

17. A process for producing a cable comprising the steps of: applying on one or more conductors, a layer comprising the polyolefin composition as defined in claim 1.

18. A method of use of the polyolefin composition as defined in claim 1, the method comprising using the polyolefin composition in an insulation layer or semi-conductive layer in a cable.

* * * * *